United States Patent [19]
Schubring

[11] 3,835,361
[45] Sept. 10, 1974

[54] AUTOMATIC PROXIMITY BRAKING SYSTEM FOR MOTOR VEHICLES

[75] Inventor: Norman W. Schubring, Troy, Mich.

[73] Assignee: General Motors Corporation, Detroit, Mich.

[22] Filed: Aug. 10, 1973

[21] Appl. No.: 387,349

[52] U.S. Cl................... 318/561, 318/364, 318/369
[51] Int. Cl. ........................................... G05b 13/02
[58] Field of Search ........... 318/362, 364, 365, 369, 318/561

[56] References Cited
UNITED STATES PATENTS
3,277,355 10/1966 Troutman et al. .................. 318/561
3,721,811 3/1973 Taylor et al. .................. 318/369 X
3,729,668 4/1973 Brette ............................... 318/561

Primary Examiner—Robert K. Schaefer
Assistant Examiner—W. E. Duncanson, Jr.
Attorney, Agent, or Firm—Howard N. Conkey

[57] ABSTRACT

A vehicle braking system for automotive vehicles in which a circuit is provided for continually calculating a controllable deceleration figure which is related to the required vehicle velocity reduction over a measured headway spacing and for calculating a non-controllable deceleration constant representing maximum deceleration available for braking action. A signal is generated for effecting vehicle braking when the deceleration figure is equal to or greater than the deceleration constant. A new, safe value of deceleration constant is obtained with each vehicle acceleration and deceleration and the deceleration constant is decreased at a predetermined rate between vehicle accelerations and decelerations.

3 Claims, 9 Drawing Figures

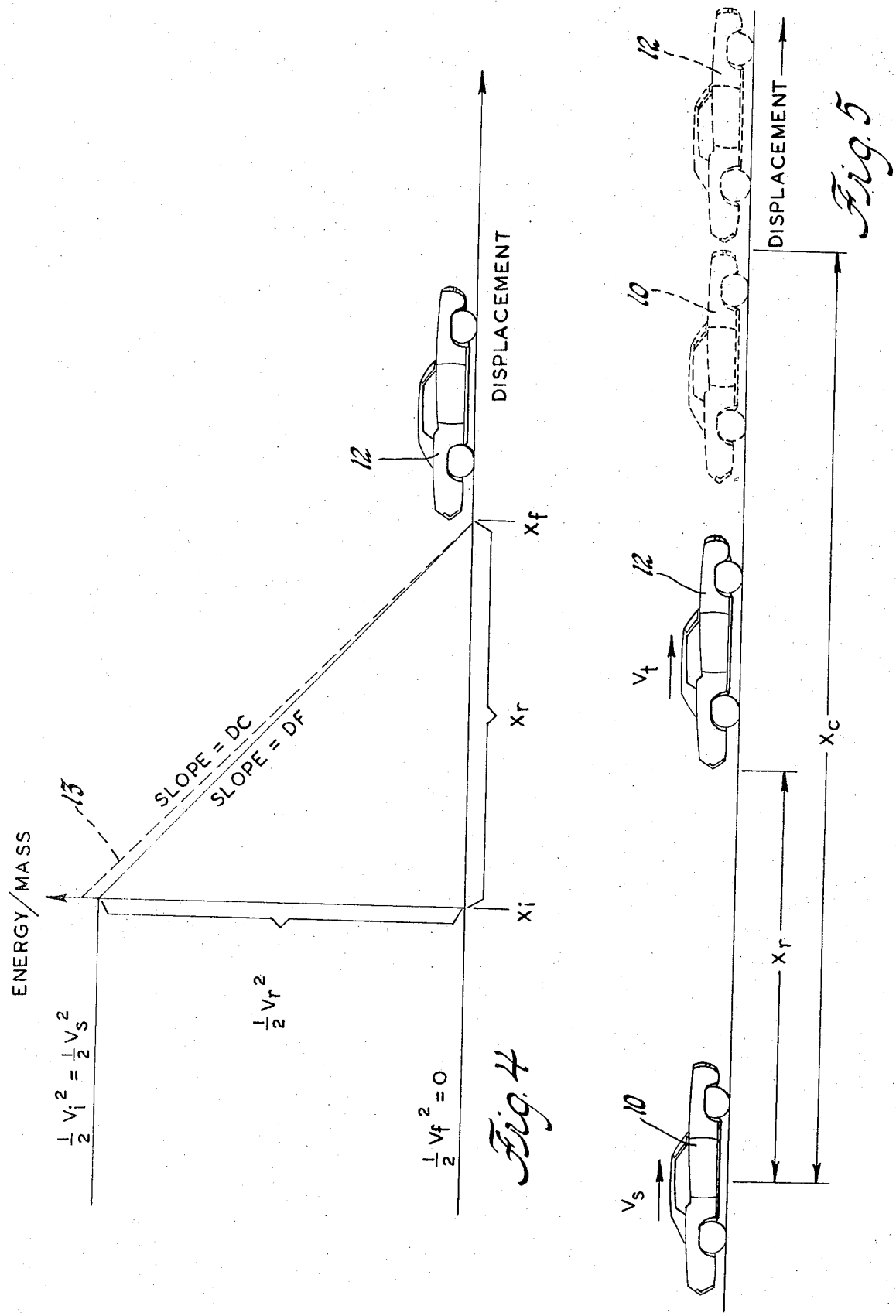

AUTOMATIC PROXIMITY BRAKING SYSTEM FOR MOTOR VEHICLES

This invention relates to a system for automatically braking a motor vehicle and more specifically, to an automatic vehicle braking system for generating a signal to effect vehicle brake application when the required velocity reduction over a measured headway spacing is equal to or greater than the maximum deceleration available for braking action taking into consideration the coefficient of friction between the vehicle and the roadway.

A large number of vehicle accidents occur as a result of the failure of vehicle operators to timely apply the vehicle brakes. It has been proposed to decrease the number of accidents resulting from the failure to timely apply vehicle brakes by incorporating in the vehicle a system responsive to vehicle-obstacle separation, vehicle-obstacle relative velocity and vehicle velocity to automatically operate the vehicle brakes to avoid a collision with the obstacle or to maintain a predetermined distance from the obstacle. In all of these known systems, there has been no consideration to the changing conditions which affect the distance required to bring a vehicle to a stop or to a given velocity from some higher velocity. For example, the coefficient of friction between a vehicle and roadway varies greatly as a function of weather conditions and roadway surface. It is the general object of this invention to provide an automatic proximity braking system for motor vehicles which takes into consideration the changing coefficient of friction between the vehicle and the road surface.

It is another object of this invention to provide an automatic proximity braking system for motor vehicles in which a new and safe value of coefficient of friction between the vehicle and road surface is obtained upon each vehicle acceleration and deceleration.

It is another object of this invention to provide for an automatic proximity braking system for motor vehicles which takes into consideration the coefficient of friction between the vehicle and the road surface and in which a new and safe value of coefficient of friction is obtained upon each vehicle acceleration and deceleration between which the value of the coefficient of friction is decreased at a predetermined rate.

It is another object of this invention to provide for an automatic proximity braking system for motor vehicles in which a deceleration figure is calculated which is related to the required velocity reduction over a measured headway spacing, which deceleration figure is compared with a deceleration constant representing the maximum deceleration available for braking action, the deceleration constant taking into consideration the coefficient of friction between the vehicle and the road surface.

These and other objects of this invention may be best understood by reference to the following description of a preferred embodiment of the invention and the drawings in which:

FIG. 4 is an energy diagram of braking action for the case of a stationary target;

FIG. 5 is a drawing illustrating the condition for collision proof braking in the case of both source vehicle and target vehicle moving in the same direction;

FIG. 8 is an energy diagram of braking action for source and target vehicles both equipped with automatic proximity braking and approaching head on.

A vehicle travelling along a roadway has an initial translational kinetic energy, $E_{ki} = mv_i^2/2$ where m is the mass and $v_i$ is the initial absolute velocity. If at some instant, a decision is made to reduce vehicle velocity, the propelling force must be interrupted and the kinetic energy must be reduced by conversion to some other form. In the typical vehicle, the energy is converted into heat by the process of friction between two bearing surfaces subjected to relative motion under controlled pressure, i.e., brake lining and its mating surface.

For locked wheel conditions, the relevant coefficient of friction, $\mu$, is that existing between the tire and the roadway surface, whereas, for less than locked wheels the coefficient of friction is that between the brake lining and its mating surface. For full braking, the maximum effective $\mu$ closely approaches that between tire and highway.

Figure 1:
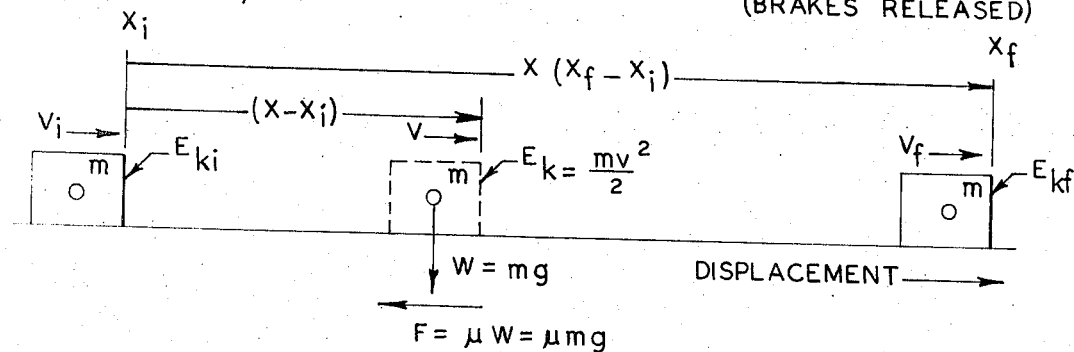
FIG. 1 is a drawing illustrating the energy interchange during vehicle braking.

Assuming rectilinear motion on a level surface, a vehicle, during braking, can be regarded as a mass m sliding along a surface as shown in FIG. 1, where $x_i$ is the initial position when brakes are applied, $x_f$ is the final position when brakes are released, and x is any intermediate instantaneous position.

If the mass m has an effective weight, $w = mg$ where g is the acceleration due to gravity, the frictional force developed to oppose the motion is $F = \mu w = \mu mg$. This frictional force, F, when operating across a distance from the initial position $x_i$ to the instantaneous position x, absorbs an energy of $$F(x - x_i) = \mu\, mg(x - x_i) \tag{1}$$

and in so doing reduces the kinetic energy by $$E_{ki} - E_k = m(v_i^2 - v^2)/2 \tag{2}$$

where $E_k$ is the instantaneous kinetic energy and v is the instantaneous absolute velocity. The energy released, equation (2), must exactly equal the energy absorbed, equation (1). Since both energy expressions are linearly proportional to mass, the kinematics of braking is independent of mass and dependent only upon velocity, distance and coefficient of friction. Thus, the energy expressions in braking will be normalized by treating them on a per unit mass basis.

The following expression for instantaneous kinetic energy per unit mass, $E_k/m$, to describe the braking behavior in FIG. 1, can be extracted from equations (1) and (2):

$$v^2/2 = -\mu g(x - x_i) + v_i^2/2 \qquad (3)$$

for $x_i \leq x \leq x_f$.

Figure 2:
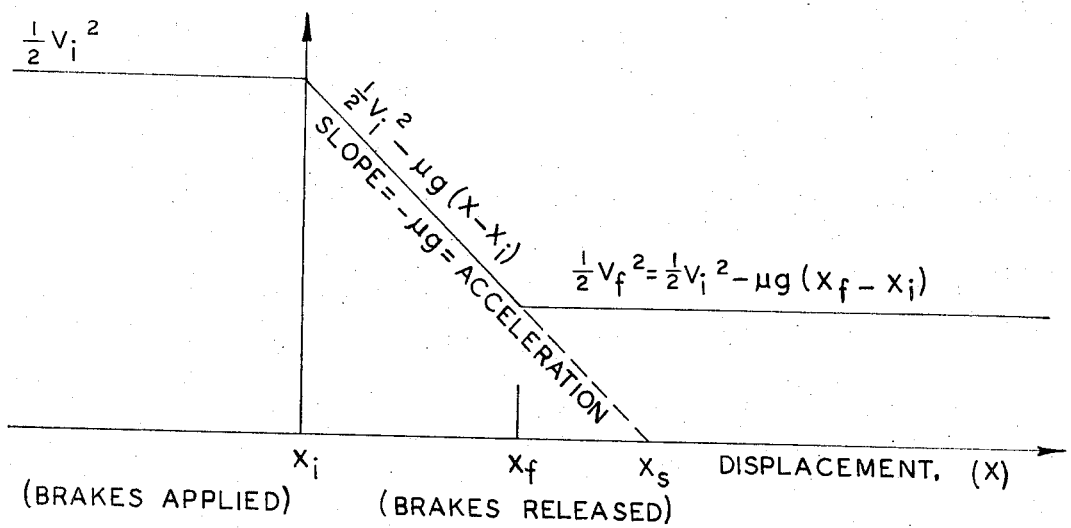
FIG. 2 is a drawing illustrating the energy diagram for braking at a fixed coefficient of friction.

As seen in FIG. 2, the plot of translational kinetic energy per unit mass, $v^2/2$, versus displacement, x, is explicitly time independent and constructed of straight lines. As seen in FIGS. 1 and 2, the vehicle, represented as mass m, travelling from left to right has an initial velocity, $v_i$, and a corresponding kinetic energy per unit mass of $v_i^2/2$. At position $x_i$, a velocity reduction is initiated by introducing the full frictional force per unit mass, $\mu g$. This causes a linear reduction in energy with distance that continues until final position, $x_f$, after which the energy/mass remains $v_f^2/2$ and the velocity at $v_f$.

Had this kinetic energy reduction continued on out to where the velocity were reduced to zero, the mass, m, would come to rest at a stop position, $x_s$, shown in the diagram of FIG. 2. It follows, then, that the minimum stopping distance for a vehicle is determined entirely by its initial velocity and the coefficient of friction available.

As noted, during fixed coefficient braking, as shown in FIG. 2, the energy/mass reduces linearly with distance, which is to say that the force per unit mass is constant. Equating the time rate of change of momentum to the force producing it, this fixed force per unit mass implies a constant acceleration (i.e., $F/m = a$). Therefore, during braking, the slope of equation (3) indicated in FIG. 2 is this acceleration. The sign of the acceleration is negative so the quantity $\mu g$ is properly a deceleration.

This quantity, $\mu g$, represents the maximum deceleration (i.e., the maximum possible slope on the energy diagram of FIG. 2) available for braking action and is variable as a function of various roadway conditions such as roadway surface and weather conditions. In addition, the quantity $\mu g$ represents a non-controllable quantity as follows:

$$\text{deceleration constant} = DC = \mu g \qquad (4)$$

Once it has been established that the roadway is capable of providing only the finite available deceleration $\mu g$, it next is of importance to define the conditions tolerable in achieving a specific velocity reduction requirement. FIG. 2 illustrates that for a given initial velocity, the minimum stopping distance $(x_s - x_i)$ is entirely fixed by the deceleration constant. Restated in corollary, for a given headway distance, a maximum allowable velocity is determined by the deceleration constant of the given roadway.

Equation (3), bounded between initial and final conditions, can be rewritten to equate the controllable variables, velocity and distance, to the deceleration constant, $\mu g$, $$(v_i^2 - v_f^2)/2(x_f - x_i) = \mu g \qquad (5)$$

This expression states the relationship between velocities and distances associated with a given deceleration constant of $\mu g$. While the deceleration constant quantity on the right of the equation (5) is a deceleration capability, the quantity on the left of equation (5) is a deceleration requirement or braking demand for the velocity to be reduced to $v_f$ at a position $x_f$. This quantity must be continuously computed and is controllable in nature as opposed to the non-controllable nature of the deceleration constant. This quantity will be defined as follows:

$$\text{deceleration figure} = DF = (v_i^2 - v_f^2)/2(x_f - x_i). \qquad (6)$$

The braking action described by equation (5) is exact, and all discussion has implied full coefficient braking. Since all braking is not of the variety having full coefficient braking, the deceleration figure does not equal the deceleration constant for the great majority of typical highway braking conditions. But, although the deceleration figure is usually less than the deceleration constant, the deceleration figure or braking requirement must never exceed the deceleration constant or braking capability. If through the distance, $(x_f - x_i)$ the velocity must have been reduced from $v_i$ to $f_f$, an imperative condition to absolutely preclude a collision is that:

$$DF \leq DC \qquad (7)$$

or $$[(v_i^2 - v_f^2)/2(x_f - x_i)] \leq [\mu g] \qquad (8)$$

In the implementation of an automatic brake control system on a vehicle, three rectilinear motion braking situations must be considered:
1. the vehicle approaching a stationary obstacle or vehicle;
2. the vehicle approaching another vehicle moving in the same direction; and
3. the vehicle approaching another vehicle moving in opposition.

Also, in the implementation of an automatic brake control system on a vehicle, the vehicle must have the capability of measuring the absolute velocity $v_f$ of the vehicle and the relative velocity, $v_r$, and the relative distance, $x_r$, between the vehicle and an obstacle or another vehicle. These measurements can be made by any conventional radar carried by the vehicle.

Figure 3:
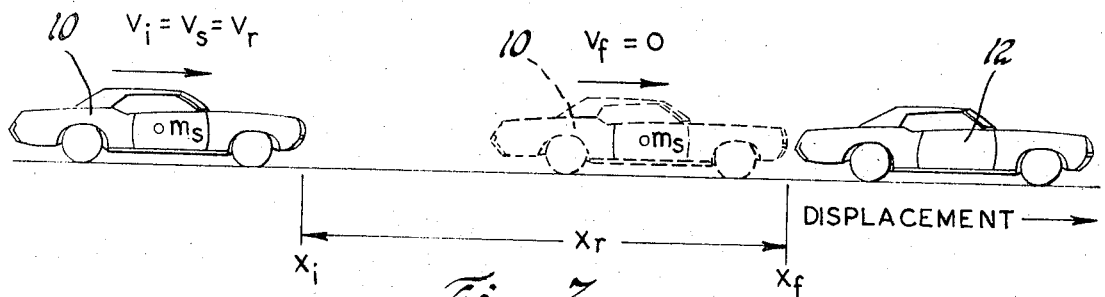
FIG. 3 is a drawing illustrating the condition for collision proof braking in the case of a stationary target.

Referring to FIG. 3, there is illustrated the case where a source vehicle 10 incorporating the braking system of this invention is approaching a stationary target vehicle 12. The obvious requirement is that the mass, $m_s$, of the source vehicle 10 with an instantaneous absolute velocity, $v_i$, must have a final absolute velocity, $v_f$, equal to zero just prior to or at the instant of contact with the target vehicle 12.

In the deceleration figure expression of equation (6), the distance $(x_f - x_i)$ is identical to the measurable distance $x_r$ between the source vehicle 10 and the target vehicle 12. Furthermore, $v_f$ equals zero and since the target vehicle 12 has zero absolute velocity, then $v_i$, which is also equivalent to $v_s$, is identical to the relative velocity $v_r$ between the source vehicle 10 and the target vehicle 12. The decleration figure for this case is:

$$DF = v_r^2/2x_r \tag{9}$$

for $v_s/v_r = 1$.

The energy diagram corresponding to this case is shown in FIG. 4. Here the slope DC of the dashed line 13 is the maximum limit that the deceleration figure may assume. The deceleration figure is readily verified as the slope, $v_r^2/2$ over $x_r$, and the condition for collision-proof braking is $$[v_r^2/2x_r] \le [\mu g] \tag{10}$$

for $v_s/v_r = 1$.

Figure 6:
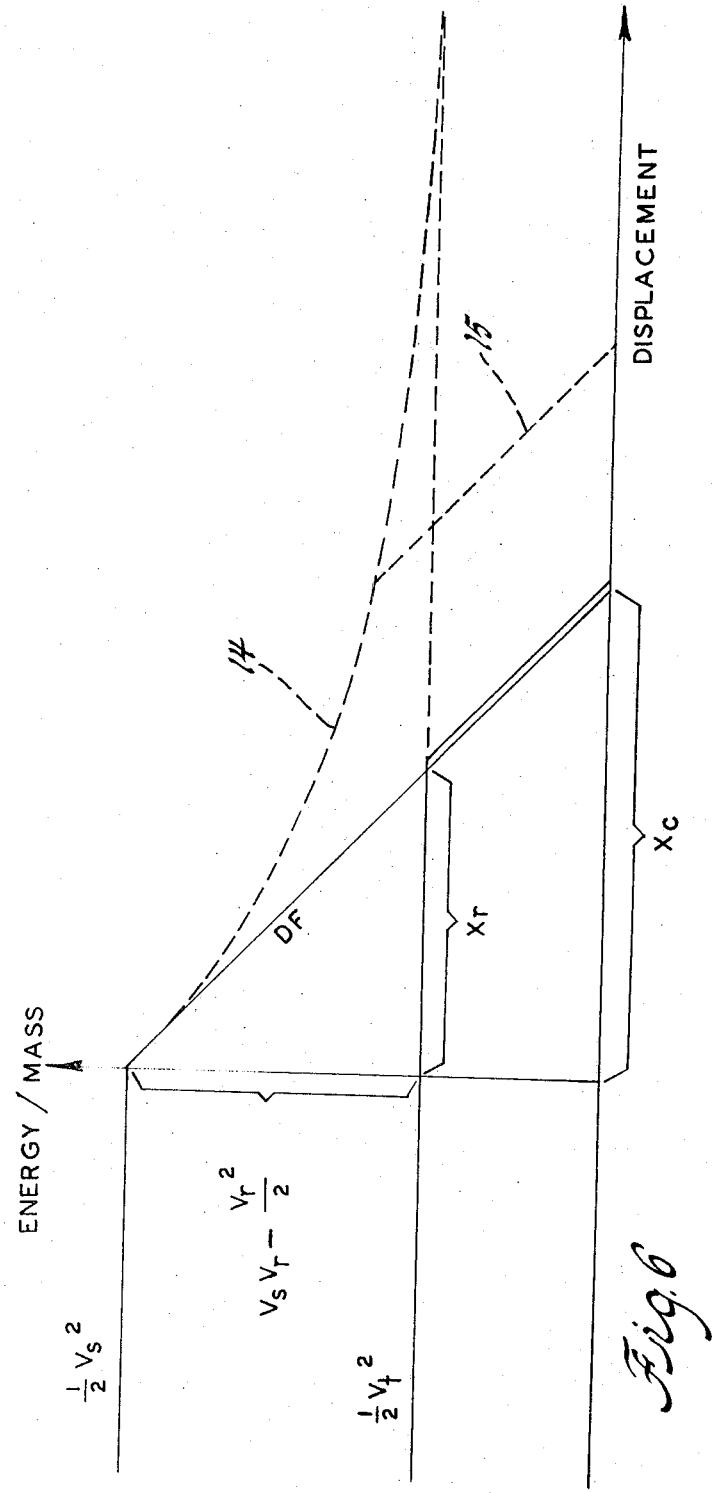
FIG. 6 is an energy diagram of braking action for the case of source and target vehicles moving in the same direction.

When the source vehicle 10 approaches the target vehicle 12 from the rear and the target vehicle 12 is also moving, ($v_s/v_r$ is greater than 1) the source vehicle 10 must reduce its velocity and continually adjust $x_r$ accordingly. Even should the target vehicle 12 initiate a full coefficient braking action during this time, the source vehicle 10 must be in a condition for panic braking without collision. This situation for incipient braking is illustrated in FIGS. 5 and 6. In this case, $v_r$ is equal to $v_2 - v_t$. The instantaneous measurable range is $x_r$, and $x_c$ is the distance to contact that the source vehicle 10 travels before rendezvousing with the target vehicle 12 if ever the target vehicle goes into full coefficient braking.

The energy diagram for the case of the target vehicle 12 moving in the same direction is shown in FIG. 6. From the energy diagram triangle, again the deceleration figure is the slope, $(v_s v_r - v_r^2/2)$ over $x_r$, and from which the condition for collision-proof braking is found to be $$[v_r^2/2x_r(2(v_s/v_r) - 1)] \le [\mu g] \tag{11}$$

for $v_s/v_r \ge 1$.

Had the target vehicle 12 continued at constant velocity $v_t$, the source vehicle 10 would reduce its energy along the dashed exponential path 14. In this way, the source vehicle 10 velocity, $v_s$, is reduced asymptotically to where the source vehicle and target vehicle are essentially in collisionless contact and both at the same final velocity.

The deceleration figure of the source vehicle 10, i.e., the instantaneous slope of the curve trajectory, is a function of the distance. Although this slope is always less than that of full braking, except on onset, it does keep the source vehicle 10 at that combination of relative distance and relative velocity such that, if the target vehicle 12, unexpectedly exercises a full coefficient braking, the source vehicle 10 will simultaneously go into full coefficient braking. The source vehicle 10 will come to rest in collisionless contact with the target vehicle 12, both along some trajectory, i.e., shown by the dashed slope 15 in FIG. 6.

Figure 7:
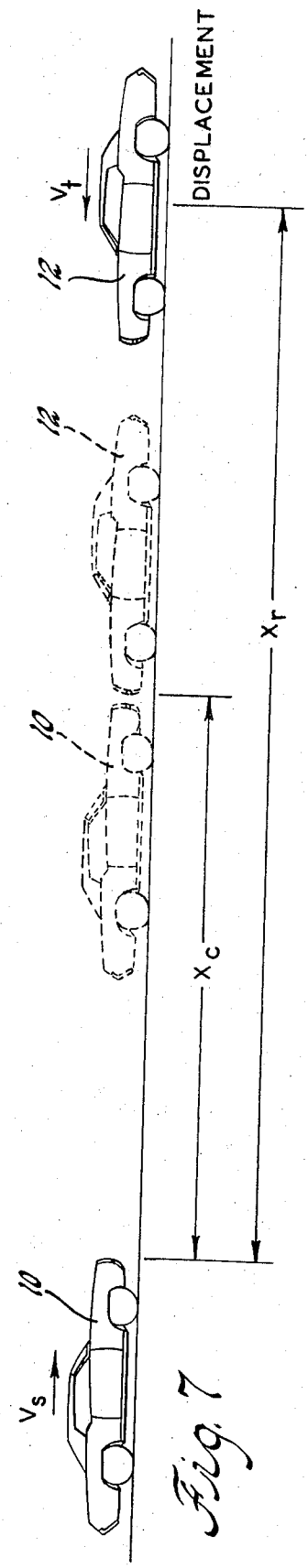
FIG. 7 is a drawing illustrating the condition for collision proof braking for the case of two vehicles approaching each other with automatic proximity braking.

Two vehicles approaching one another head on cannot be analysed except for the case of both vehicles equipped with automatic proximity brakes. In the case of approaching vehicles, the measurable relative velocity $v_r$ is greater than the source velocity, i.e., $v_s/v_r$ is less than 1. This condition is illustrated in FIG. 7.

Figure 8:
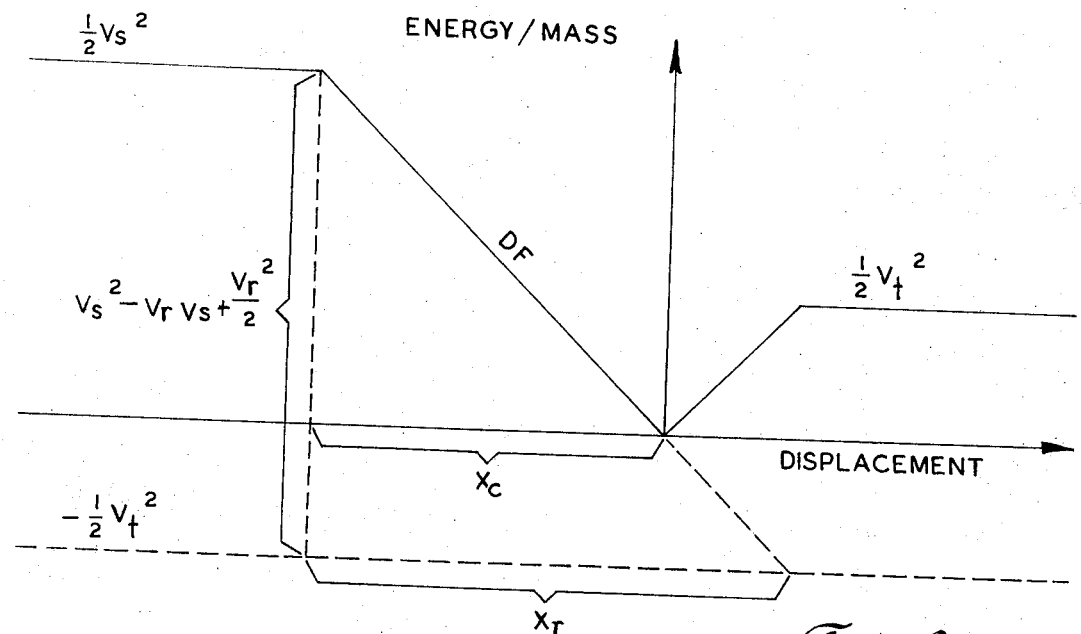

The energy diagram applicable to the circumstance where the relative velocity $v_r$ exceeds the velocity $v_s$ of the source vehicle 10 is shown in FIG. 8. The distinction in this case over the previous case is that the difference in energies between the two vehicles 10 and 12 is the algebraic difference, $(v_s^2/2) - (v_t^2/2)$. From this diagram, as before, the collisionproof condition can be written as $$[v_r^2/2x_r 1 - 2(v_s/v_r) + (2v_s^2/v_r^2))] \le [\mu g] \tag{12}$$

for $v_s/v_r \le 1$.

It can be seen that both relative motion expression equations (11) and (12) revert to the absolute motion expression of equation (10) when $v_s = v_r$.

In the last described case when two vehicles are approaching one another, an early and full panic node of braking may be preferable, such as in the case where a vehicle is travelling the wrong way on an expressway. Accordingly, when it is determined that the relative velocity $v_r$ is greater than the velocity $v_s$ of the source vehicle 10, a deceleration figure should be selected that begins to stop both vehicles 10 and 12 as soon as possible. Therefore, of the deceleration figures that can be synthesized, the one that creates the largest value should be selected. A review of the foregoing expressions reveals that the quantity $v_r^2/2x_r$ which corresponds to the stationary target vehicle case is the safest value and consequently will be used in the case of two vehicles approaching one another.

To mechanize an automatic braking system according to the foregoing analysis, the deceleration figure functions to be synthesized are reduced to the following:

$$DF = [(v_r^2/2x_r)(2v_s/v_r - 1)] \tag{13}$$

for $v_s \ge v_r$
and $$DF = [v_r^2/2x_r] \tag{14}$$

for $v_s \le v_r$.

As previously indicated, the appropriate deceleration figure cannot at any time exceed the deceleration constant in order to insure against the possibility of collision between the source vehicle 10 and target vehicle 12.

Figure 9:
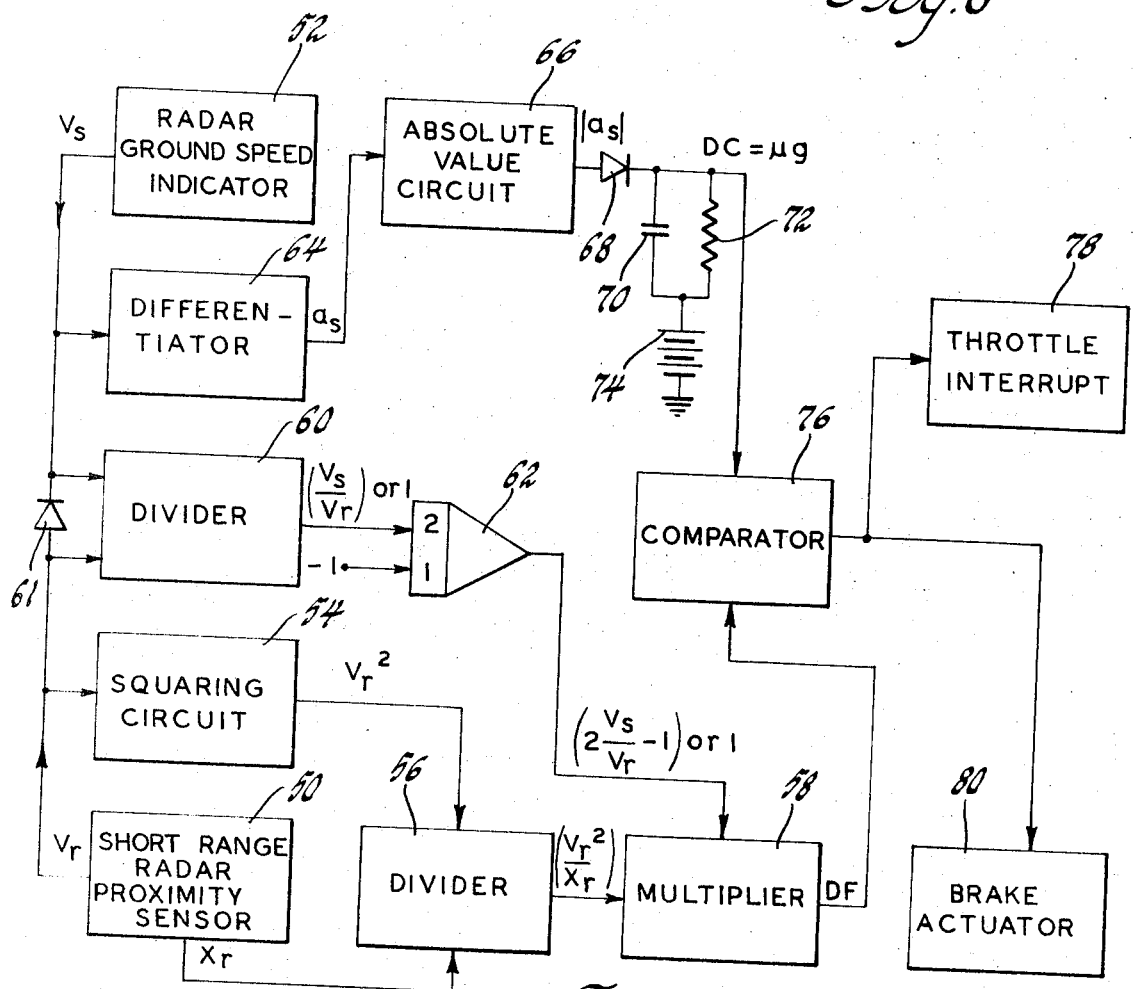
FIG. 9 is a block diagram of the automatic proximity braking system of the invention for generating a throttle release and brake actuating signal.

Referring to FIG. 9, there is shown a block diagram for generating a signal for effecting throttle release and brake operation when the deceleration figure is equal to or greater than the deceleration constant.

A short range radar proximity sensor 50 is carried by the source vehicle 10 and measures the relative velocity $v_r$ and the relative distance $x_r$ between the source vehicle 10 and an obstacle in the path of the vehicle 10 such as the target vehicle 12. A radar ground speed indicator 52 is also carried by the source vehicle 10 and measures the source vehicle wheel velocity $v_w$ in units equivalent to linear vehicle velocity $v_s$. The radar proximity sensor 50 and ground speed indicator 52 may take the form of any well known radar systems which provide the required measurements. Also, the radar ground speed indicator 52 could be replaced by any other conventional means of providing actual vehicle velocity such as a fifth wheel ground speed indicator.

The outputs of the radar proximity sensor 50 are signals having magnitudes related to relative velocity $v_r$ and $x_r$ respectively. The signal related to $v_r$ is supplied to a squaring circuit 54 whose output is a signal having a magnitude representing $v_r^2$. The output of the squaring circuit 54 is supplied to the dividend input of a divider 56 and the $x_r$ output of the short range radar proximity sensor 50 is supplied to the divisor input of the divider 56. The output of the divider 56 is a signal having a magnitude representing the quotient $v_r^2/x_r$ which is supplied to an input of a multiplier 58 having a scaling factor of 0.5.

The signal from the ground speed indicator 52 representing the absolute source vehicle velocity $v_s$ is supplied to the divident input of a divider 60 and the signal from the short range radar proximity sensor 50 representing the relative velocity $v_r$ is coupled to the divisor input of the divider 60 and to the dividend input thereof through a diode 61. The output of the divider 60 is a signal representing the quotient $v_s/v_r$ provided that $v_s$ is greater than $v_r$ and supplies a signal representing the quotient unity when $v_s$ is equal to or less than the magnitude of $v_r$ as both inputs of the divider 60 are equal when the diode 61 is forward biased.

The output of the divider 60 is supplied to one input of a summer 62 having a scaling factor of 2. A signal having a magnitude equal to −1 is supplied to a second input of the summer 62 having a scaling factor of 1. The output of the summer 62 is equal to $2(v_s/v_r) - 1$ if the magnitude of $v_s$ is greater than the magnitude of $v_r$ and is equal to +1 if the magnitude of $v_r$ is equal to or greater than the magnitude of $v_s$. The output of the summer 62 is supplied to a second input of the multiplier 58 having a scaling factor of 1. The multiplier 58 delivers a signal equal to the product of the inputs thereof times the respective scaling factors which output represents the deceleration figure of equation (13) when $v_s$ is equal to or greater than $v_r$ or equation (14) when $v_s$ is equal to or less than $v_r$.

The output of the radar ground speed indicator 52 is supplied to the input of a differentiator 64 whose output is a signal representative of the rate of change of the velocity $v_s$ or acceleration $a_s$ of the source vehicle 10. Depending on whether the velocity $v_s$ is increasing or decreasing, the acceleration of the source vehicle 10 will be either positive or negative. This acceleration is expressible as $\pm k(\mu g)$ or $\pm k(DC)$ where $k$ is proportional to the percentage of the acceleration or deceleration relative to the maximum possible acceleration or deceleration.

Accordingly, if the vehicle is decelerating at full braking capability, then $k = -1$ and $a_s = -\mu g$. On the other hand, if the vehicle is accelerating at full capability (i.e., threshold of wheel slip), then $k = +1$ and $a_s = +\mu g$. Thus, a measure of maximum absolute value of acceleration $|a_s|$ provides a measure of the coefficient of friction, as $\mu = |a_s|/g$. More directly, $|a_s| = \mu g = DC$. This signal representing absolute value of acceleration is obtained by supplying the output of the differentiator 64 to an absolute value circuit 66 whose output is a signal having a magnitude equal to the absolute magnitude of acceleration $|a_s|$. This signal is coupled by a diode 68 to ground through the parallel combination of a storage capacitor 70 and a resistor 72 in series with a dc voltage source 74, the negative terminal of the dc voltage source 74 being grounded. The capacitor 70 is charged by the output of the absolute value circuit 66 through the diode 68 and the dc voltage source 74 so that the potential at the cathode of the diode 68 represents the deceleration constant. Whenever either a full braking or a full acceleration occurs, the sum of the voltage across the capacitor 70 and the voltage of the dc voltage source 74 represents the maximum deceleration capability of the source vehicle 10. At all other degrees of braking or acceleration, the magnitude of $k$ is less than unity and the sum of the voltage across the capacitor 70 and the voltage of the dc voltage source 74 represents a capability of deceleration which is equal to or less than the maximum possible deceleration as dictated by the coefficient of friction $\mu$ at the time the acceleration or deceleration function was performed. To allow for changing road conditions between accelerations or decelerations of the source vehicle 10 or when the source vehicle 10 is at rest for an extended period of time, the value of deceleration constant is permitted to decay at a predetermined rate by virtue of the resistor 72 coupled in parallel with the capacitor 70. If neither deceleration or acceleration occurs for some period of time, the deceleration constant value stored across the capacitor 70 decays until the deceleration constant is determined only by the magnitude of the voltage of the dc voltage source 74. This voltage may correspond to a very safe value of deceleration constant which the deceleration figure may never exceed. Subsequently, each time there is some change in velocity, the memorized deceleration constant is updated as previously indicated.

As can be seen from the foregoing, the capacitor 70 effectively stores a voltage representing the peak value of acceleration or deceleration. This value is decreased at a slow rate by the discharge of the capacitor 70 through the resistor 72. When the diode 68 becomes forward biased, i.e., actual acceleration or deceleration exceeding the then stored value represented by the voltage across the capacitor 70 and the voltage of the dc voltage source 74, the capacitor is again charged to a voltage representing the new value of acceleration or deceleration. In this way, a new and safe value of deceleration constant is repeatedly measured and stored as a result of vehicle accelerations or decelerations. The feature of the decaying deceleration constant over a period of time forms a significant feature of this invention in that the memorized deceleration constant decreases at a certain rate so that if the brakes are not used for an extended period of time or the vehicle is not accelerated for an extended period of time, the automatic braking system relaxes to a safer value of deceleration constant which the deceleration figure cannot exceed.

The voltage representing the deceleration constant appearing at the cathode of the diode 68 across the capacitor 70 and the dc voltage source 74 is coupled to a high impedance input of a comparator 76 and the output of the multiplier 58 representing the deceleration figure is supplied to a second input of the capacitor 76. The high input impedance of the comparator 76 prevents the discharge of the capacitor therethrough. The comparator compares the deceleration constant and the deceleration figure and generates a positive signal if the deceleration figure is greater than or equal to the deceleration constant and supplies a ground signal if the deceleration figure is less than the deceleration constant. The generation of a positive signal by the comparator 76 indicates the need for reducing the velocity of the source vehicle 10. Accordingly, the output of the comparator is coupled to a throttle interrupt circuit 78 to terminate propelling power and to a brake actuating circuit 80 which functions to apply the vehicle brakes. As the source vehicle 10 decelerates, the measured velocity $v_s$ leads to a computer $a_s$ that feeds back to modulate the braking action. The throttle interrupt circuit 78 and the brake actuating circuit could take the form of solenoid enabled vacuum motors.

What has been described is an automatic vehicle braking system wherein an uncontrollable deceleration constant is measured which is equal to or less than the maximum possible deceleration that the vehicle can experience taking into consideration the coefficient of friction between the vehicle and the road surface, wherein a deceleration figure is calculated from measurements of vehicle velocity, relative velocity between the vehicle and a target and the relative distance between the vehicle and the target which represents the deceleration required to bring the vehicle to a stop prior to impact with the target and wherein the deceleration constant and the deceleration figure are compared to determine whether a condition exists in which the vehicle brakes must be applied to prevent impact between the vehicle and target.

It is claimed:

1. An automatic vehicle braking system for actuating the vehicle brakes comprising: means for generating a first velocity signal having a value representing vehicle velocity; a differentiator responsive to the first velocity signal for generating a rate signal having a value representing the rate of change in vehicle velocity; means responsive to the rate signal for memorizing the peak rate of change in vehicle velocity, the memorized rate of change in vehicle velocity representing a vehicle deceleration capability; means for generating a second velocity signal having a value representing the relative velocity between the vehicle and an obstacle in the path of travel thereof and a distance signal having a value representing the relative distance between the vehicle and the obstacle; means responsive to the first and second velocity signals and the distance signal for generating a deceleration signal having a value representing the vehicle deceleration required to prevent contact with the obstacle; comparator means responsive to the memorized peak rate of change in vehicle velocity and the deceleration signal for generating a braking signal when the deceleration signal represents a required vehicle deceleration at least equal to the memorized rate of change in vehicle velocity; and means responsive to the braking signal for actuating the vehicle brakes.

2. An automatic vehicle braking system for actuating the vehicle brakes comprising: means for generating a first velocity signal having a value representing vehicle velocity; a differentiator responsive to the first velocity signal for generating a rate signal having a value representing the rate of change in vehicle velocity; storing means for storing the rat signal at its peak value; means for decreasing the value of the stored signal at a predetermined rate, the stored signal representing a vehicle deceleration capability; means for coupling the rate signal to the storing means when the value of the stored signal is below the value of the rate signal so as to update the value of the stored signal; means for generating a second velocity signal having a value representing the relative velocity between the vehicle and an obstacle in the path of travel thereof and a distance signal having a value representing the relative distance between the vehicle and the obstacle; means responsive to the first and second velocity signals and the distance signal for generating a deceleration signal having a value representing the vehicle deceleration required to prevent contact with the obstacle; comparator means responsive to the stored signal and the deceleration signal for generating a braking signal when the value of the deceleration signal represents a required deceleration at least equal to the value of the stored signal representing a vehicle deceleration capability; and means responsive to the braking signal for actuating the vehicle brakes.

3. An automatic vehicle braking system for actuating the vehicle brakes comprising: means for generating a first velocity signal $v_s$ having a value representing vehicle velocity; a differentiator responsive to the first velocity signal $v_s$ for generating a rate signal having a value representing the rate of change in vehicle velocity; storing means for storing the rate signal at its peak value; means for decreasing the value of the stored signal at a predetermined rate, the stored signal representing a vehicle deceleration capability; means for coupling the rate signal to the storing means when the value of the stored signal is below the value of the rate signal so as to update the value of the stored signal; means for generating a second velocity signal $v_r$ representing the relative velocity between the vehicle and an obstacle in the path of travel thereof and a distance signal $x_r$ representing the relative distance between the vehicle and the obstacle; means responsive to the first velocity signal $v_s$, the second velocity signal $v_r$ and the distance signal $x_r$ for generating a deceleration signal having a value $v_r^2/2x_r$ when $v_r$ is at least equal to $v_s$ and having a value $v_r^2/2x_r ((2v_s/v_r) - 1)$ when $v_s$ is at least equal to $v_r$; comparator means responsive to the stored signal and the deceleration signal for generating a braking signal when the value of the deceleration signal represents a required vehicle deceleration at least equal to the value of the stored signal representing a vehicle deceleration capability; and means responsive to the braking signal for actuating the vehicle brakes.

* * * * *

PO-1050
(5/69)

UNITED STATES PATENT OFFICE
CERTIFICATE OF CORRECTION

Patent No. 3,835,361    Dated September 10, 1974

Inventor(s) Norman W. Schubring

It is certified that error appears in the above-identified patent and that said Letters Patent are hereby corrected as shown below:

Column 4, line 24, "$v_i$ to $f_f$" should read -- $v_i$ to $v_f$ --.

Column 5, line 26, "$v_2 - v_t$" should read -- $v_s - v_t$ --; line 34, "$(v_s v_r - v_r^2/2)$" should read -- $v_s - v_r^2/2)$ --; Equation (11) should read -- $[(v_r^2/2x_r)(2(v_s/v_r) - 1)] \leq [\mu g]$; Column 6, Equation (12) should read -- $[(v_r^2/2x_r)(1 - (2 v_s^2/v_r^2))] \leq [\mu g]$; line 18, after "panic", "node" should be -- mode --; Equation (13) should read -- $DF = [(v_r^2/2x_r)(2(v_s/v_r) - 1)]$ --; line 18, "divident" should be -- dividend --;

Column 8, line 61, "capacitor" should be -- comparator --; Column 10, line 4, "rat" should be -- rate --; line 49, "$(v_r^2/2x_r)(2 v_s/v_r) - 1)$" should read -- $(v_r^2/2x_r)(2(v_s/v_r) - 1)$ --.

Signed and sealed this 1st day of April 1975.

(SEAL)
Attest:

RUTH C. MASON
Attesting Officer

C. MARSHALL DANN
Commissioner of Patents
and Trademarks